US011960454B2

(12) United States Patent
Latorre et al.

(10) Patent No.: US 11,960,454 B2
(45) Date of Patent: Apr. 16, 2024

(54) METHOD OF A UNIVERSAL REGISTRATION AND IDENTIFICATION OF LEGAL PROCEDURES

(71) Applicant: CONÉCTATE SOLUCIONES Y APLICACIONES SL, Soria (ES)

(72) Inventors: Fernando Latorre, Soria (ES); Nuria Sala Cano, Soria (ES)

(73) Assignee: CONÉCTATE SOLUCIONES Y APLICACIONES SL, Soria (ES)

( * ) Notice: Subject to any disclaimer, the term of this patent is extended or adjusted under 35 U.S.C. 154(b) by 476 days.

(21) Appl. No.: 16/920,711

(22) Filed: Jul. 5, 2020

(65) Prior Publication Data

US 2021/0209070 A1 Jul. 8, 2021

(30) Foreign Application Priority Data

Jan. 3, 2020 (ES) .................. 202030004U

(51) Int. Cl.
*G06F 16/20* (2019.01)
*G06F 16/182* (2019.01)
*H04L 9/06* (2006.01)
*G06Q 50/18* (2012.01)

(52) U.S. Cl.
CPC ........ *G06F 16/1837* (2019.01); *H04L 9/0637* (2013.01); *G06Q 50/18* (2013.01)

(58) Field of Classification Search
CPC .... G06Q 50/18; H04L 9/0637; G06F 16/1837
See application file for complete search history.

(56) References Cited

U.S. PATENT DOCUMENTS

| 2007/0150387 | A1* | 6/2007 | Seubert | .................. | G06Q 10/10 705/31 |
| 2009/0150906 | A1* | 6/2009 | Schmidt | .................. | G06Q 50/18 719/317 |
| 2009/0300723 | A1* | 12/2009 | Nemoy | ................. | H04L 63/102 726/4 |
| 2009/0326995 | A1* | 12/2009 | Sorisi | ..................... | G06Q 30/02 705/26.1 |
| 2012/0131168 | A1* | 5/2012 | Foti | ......................... | H04W 4/70 709/223 |

(Continued)

*Primary Examiner* — Tarek Chbouki
(74) *Attorney, Agent, or Firm* — Norton Rose Fulbright Canada LLP; Maya Medeiros

(57) ABSTRACT

A method of universal registration and identification of legal procedures and related parties and/or component parts to achieve the unification of the identification of legal procedures, allowing an individual or organization to carry the data related to their legal procedures, the verification of the related data, the assignation of access rights for accessing the data, as well as the unification of the history of procedures and documents. The generation of a unique and non-transferable public identifier for each legal procedure and also for each related part and it consists of different fields (some of the fields are mandatory and others are optional) combining URN, UUID, OID and DID formats. An entity such as an individual, an organization or a digital service can verify the authenticity of both the identifier of a legal procedure, of the DID document associated and of the data associated with said identifier.

14 Claims, 1 Drawing Sheet

(56) References Cited

U.S. PATENT DOCUMENTS

| | | | |
|---|---|---|---|
| 2015/0310571 A1* | 10/2015 | Brav | G06Q 10/00 |
| | | | 705/311 |
| 2016/0171040 A1* | 6/2016 | Maruny Vidal De Oliveira | |
| | | Martins | G06Q 10/10 |
| | | | 707/701 |
| 2018/0365686 A1* | 12/2018 | Kondo | G06Q 20/382 |
| 2019/0088063 A1* | 3/2019 | Unagami | H04L 63/0428 |
| 2019/0229914 A1* | 7/2019 | Patel | G06F 21/45 |
| 2019/0253254 A1* | 8/2019 | Brownlee | H04L 9/0618 |
| 2020/0104307 A1* | 4/2020 | Keskar | G06F 21/602 |
| 2020/0167769 A1* | 5/2020 | Green | G06Q 20/3825 |

* cited by examiner

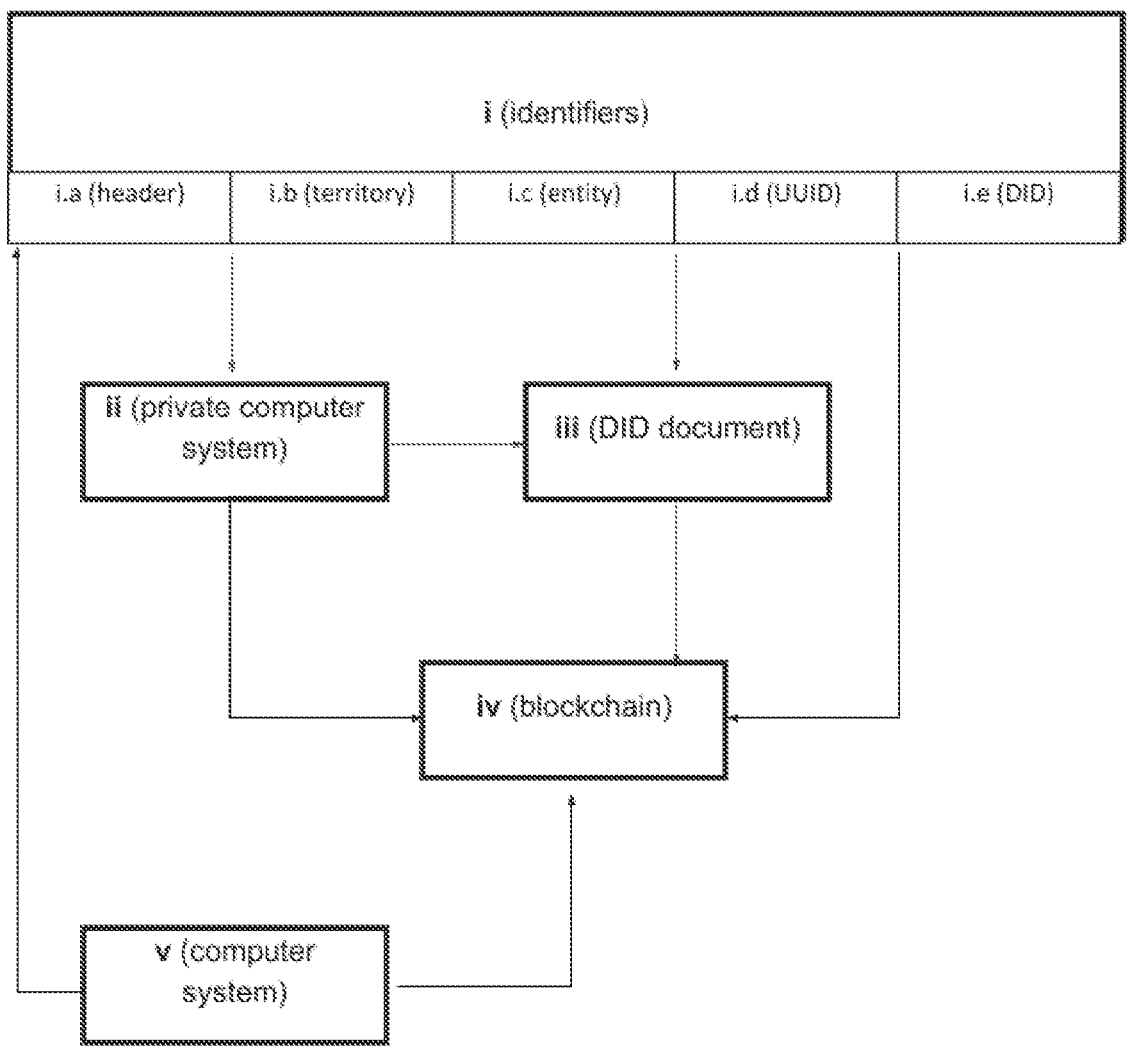

METHOD OF A UNIVERSAL REGISTRATION AND IDENTIFICATION OF LEGAL PROCEDURES

TECHNICAL FIELD

The present invention relates to a method of a universal registration and identification of legal procedures within the legal procedures sectors, decentralized identity, data management systems and blockchain networks, encompassing at the same time administrative, medical, contractual, police, judicial, voting, eligibility, electoral and notary procedures.

BACKGROUND OF THE INVENTION

A procedure consists of the set of rules for conducting a judgment on something determined. They are the rules governing the formalities, acts and decisions through which a judgment is exercised on something specific. The term procedure is not exclusive to procedural law, nor in the legal field. It only refers to a formal aspect or external activity, such as the mere succession of procedural acts.

The concept of process is more complex than procedural. Every process involves the existence of a procedure, but not always where there is a procedure there is a process. The term process encompasses a broader reality: in addition to the legally envisaged procedure, it also includes the relations between the intervening subjects, the relations between them and the subject matter of the process, etc. The process also aspires to a purpose, which is the fair termination of it, and to reach it uses the procedure as a means.

On the other hand, judgment and process allude to the same phenomenon, but while judgment refers to the action of judging, the process refers to the means used for it. Within the process there is a judgment, but not every judgment can be identified with the process. Both terms are only equivalent when the act of judging is carried out by bodies vested with jurisdictional authority.

The voting, eligibility, electoral, administrative, tenders and judicial procedures are constituted by a set of rules that legally determine how elections, referendums, selection processes are carried out in case of tenders, election campaigns, processes of deliberation, the casting of the vote (among others) within public (government, court) or private regulations (enterprises, non-profit organizations and informal organizations) and how their results are determined. There are votes in the area of public or private administrative procedures (e.g. for example, awarding grants and subsidies, choosing winners in a tender), in voting, eligibility, electoral or referendum proceedings, as well as in judicial proceedings. Each procedure will therefore determine in each case by specific rules: what the conditions of participation and the composition of the same will be; what the election campaign will look like, the tender, the preliminary phases, the selection process, the instructional process, among others; what the deliberation process as well as what the voting process will look like; how the counting and communication of the results will be carried out; you can also set other rules such as the start date and time and/or end of each of the steps or processes within the procedure, without ruling out other possible ones.

In addition to the above, a document is defined in a procedure as the means of evidence consisting of any material object or medium incorporating the written or graphic expression of a human thought or act. The document may be made or issued publicly or privately, such as legal documents in an administrative procedure, in a medical procedure, by means of a contract signed by two or more parties, a vote cast by a participant in a voting process, etc. For example, in the field of health and from a legal point of view, the concept of a clinical document is the means by which the clinical information provided to a procedure is integrated. The basic elements of the modern procedural notion of the document are as follows: (a) it is a means of actual proof or direct perception; (b) incorporates a human thought or act, c) the medium must allow the physical translation of the document into a judicial presence; (d) the medium does not have to be a role, allowing the documentary qualification of other media such as computer media; (e) can reflect both a thought (intellectual creation) and a human act, allowing the concept of a document to be extended to graphics, photographs, sketches or drawings; (f) representation does not have to be written, but for the purposes of documentary qualification, graphic signs or expressions of human thoughts or acts are valid; (g) signature is not an essential element of the documentary nature, although it is extremely useful in determining the authorship of the document; (h) the date must be considered, like signature, an important but not essential element.

From the point of view of health documentation, the laws for patient autonomy and clinical information rights and obligations provide a set of very useful definitions in a field as specialized as practice in medical information. Here are a few: a) Medical certificate: written statement from a medical professional attesting to a person's health status at a given time. b) Informed consent: the free, voluntary and conscious conformity of a patient, manifested in the full use of his faculties after receiving the appropriate information, so that an action that affects his health takes place. c) Clinical documentation: the support of any type or class that contains a set of data and information of a care nature. d) Medical history: the set of documents containing data, assessments and information of any kind about the situation and clinical evolution of a patient throughout the care process. e) Clinical information: any data, whatever its form, class or type, that allows to acquire or expand knowledge about the physical condition and health of a person, or how to preserve, care for, improve or recover them. f) Medical discharge report: the document issued by the responsible physician in a health center at the end of each patient's care process, which specifies the patient's data, a summary of their clinical history, the care activity provided, the diagnosis and therapeutic recommendations. g) Intervention in the field of health: any action carried out for preventive, diagnostic, therapeutic, rehabilitative or research purposes. h) Free choice: the right of the patient or user to choose, freely and voluntarily, between two or more healthcare alternatives, between several practitioners or between healthcare facilities, in the terms and conditions established by the competent health authorities. i) Responsible medical professional: a medical professional who is in charge of coordinating the information and healthcare of the patient or user, with the character of its main interlocutor in everything related to their care and information during the healthcare process, without prejudice to the obligations of other professionals who participate in healthcare activities.

The clinical report is therefore defined as the document by which a patient's medical or care manager records or discloses certain issues related to the physical or mental disorders he suffers, the diagnostic and therapeutic methods applied and, where appropriate, the functional impacts that may arise from such disorders. Taking as a perspective their legal effects, the fundamental elements of clinical reports can be classified into subjective, objective and according to purpose as follows:

Subjective elements: Depending on the information contained, the clinical report may be issued by a healthcare professional who provides its services in the different health care units. It should also be noted that clinical reports may be issued or certified by the centres or units in which medical professionals serve, although in these cases the identification of the professional who issued the report cannot be ignored, corresponding to the centre or the exclusive unit issue or notification work. But what is decisive of in the clinical report is the authorship of the doctor or healthcare professional "therapist", that is, the professional who has been entrusted with the treatment, diagnosis and evolution of the patient. Unlike other medical reports and noted in expert reports, the clinical report can only be issued by the physician or healthcare professional directly in charge of the patient, or the person responsible for the medical-care team who has treated the patient at a certain point in his/her medical biography.

Objective elements: Clinical reports can have very different content. Broadly speaking, they may contain any useful information regarding symptomatology, data, diagnosis, treatment, prognosis and effects of a given health relationship. In relation to content, the clinical history must be differentiated from the clinical report. The clinical report may be part of the medical history or can be prepared from it, but its content is always much more concrete and limited. The medical history can be defined as the pathological biography of a given person, while the clinical report discloses a certain episode, a specific aspect or a certain circumstance of such pathological biography, that is, of the medical-care relationship between health workers and the patient. This medical-care relationship presents, as has been said, a wide range of perspectives, so the clinical report does not merely find objective data drawn from the "pathological biography" of the patient, but often contains prognosis, medical opinions, information provided by the patient or by third parties, or foreseeable effects arising from disease or treatment. Thus, the objective limits of the clinical report are extraordinarily broad, being able to accommodate any circumstance, fact or data that is part of the medical-care relationship between the health personnel and the patient, being the information of a clinical nature (doctor-care) the essential objective element that defines the clinical report and that relates to the actions aimed at the diagnosis, treatment and cure of the patient.

According to purpose: For legal purposes, it is important to stress that the clinical report is a document prepared for assistance-informational purposes, intended to preferably serve purpose to other doctors or healthcare professionals in the treatment of the patient, or to provide information to the patient himself about his/her health status or in the procedures or results of health treatment. This legal nature serves to establish the differences or coincidences between clinical reports and medical-expert reports. In fact, the clinical report has a dual purpose, covering both internal information with proper function, as well as external information with extra-health (external) disclosure function. This convergence of purposes can lead to some confusion between clinical reports and expert reports since, according to this first legal definition, both would allow knowledge of data on the physical or mental health of a given person. It should be clarified that the legal document in this case is not the clinical report but the medical report, and that medical documents and medical-legal documents can be distinguished within that category. Clinical reports belong to the kind of medical documents themselves, while expert reports constitute medical-legal reports. Thus, one can speak of medical-clinical reports and medical-expert reports.

Some models of clinical reports are: discharge report, outpatient report, emergency report, primary care report, laboratory test results, imaging test results, nursing care report, medical history summary. The model of each report follows a common scheme, including, in addition, the peculiarities derived from each type of action. The common scheme can be defined in four sections, which clearly organize the contents: 1) Document data, section containing the type of document, date, signature and identification of the acting healthcare professional; 2) Data from the issuing institution, through which the entity providing the health service, the service provider, the centre and its address are identified; 3) Patient data, with personal identification and reference of your medical history; 4) Data of the healthcare process, section whose items are adapted in each case to the type of medical service provided (primary care, external consultation, emergencies, tests, etc.).

From a legal-procedural point of view, the clinical report is a document whose purpose is not to rework but to certify, document or reconstruct certain aspects of the patient's health biography. However, it can be useful in a legal process as a reflection of clinical-care actions, to demonstrate controversial facts directly or indirectly related to the physical or mental health of a particular person. The clinical report must therefore be differentiated from the medical-expert report. The clinical report is a document prepared outside, and usually before the process, drafted in the context of healthcare, containing data and/or opinions of the doctor or health personnel who assist and treat the patient, and whose purpose is care.

From this point of view, the clinical report can be a document that forms part of the clinical history (original clinical report) or a document prepared "expressly" based on the data in the history itself (derived clinical report) upon request of the patient, being in both cases a document that reflects medical data or opinions, and produced in the course and for the patient's healthcare. The difference in the expert report starts from three fundamental elements: authorship, content and purpose. As noted above, the clinical report is prepared by the doctor or health care personnel treating the patient. The medical expert has a non-therapeutic but analytical relationship with the patient. The expert arises in the legal process and because of the process, while the author of the clinical report is the therapist of the patient being examined in the process. The therapeutic relationship is external to the process, while the expert brings direct cause of the process.

From the objective point of view, i.e. from the contents of the report, the clinical document contains data, opinions, results, diagnoses, forecasts or assessments related to the patient's health. It therefore reflects therapeutic content, analysis of strategies or clinical information arising in the course of medical treatment. On the contrary, the expert report contains maximums of experience, abstract or applied, which seek to relate the state of health of the subject with certain facts or circumstances, which generally have the consideration of "effects" of the subject's health on certain aspects of reality with legal significance. Taking into account its purpose, the clinical report aims to contribute to the treatment and healing of the subject, while the expert report serves only an external analytical and informative function of the health of the subject in connection with certain plots of his conduct.

In turn, the clinical report of the medical certificate can be further differentiated to further specify between the diversity of health documents. In this sense, it is possible to distinguish between clinical reports produced during or on the occasion of therapeutic treatment, and medical certificates issued by the doctor or healthcare professional in charge of the treatment of the patient when required by an authorized third party in order to prove data or extremes generated or produced during treatment but which are not individualized among the documents that are part of the medical history. This is generally specific information on specific aspects of health treatment, which may be required by judges and courts and which can be accredited without the need to submit more complete and complex clinical reports or documents. In this case it deals with medical-legal documents, issued as certificates about acts or data that work in the clinical documentation that is part of the patient's history. In short, the clinical report, as a continent of data collected in the course of the medical-patient relationship that can be incorporated into a process in order to prove facts relating to health treatment, is considered as a source of documentary evidence, being procedurally subject to the regime of the media developed outside or on the margin of the judicial procedure.

On ownership, it should be noted that there are, therefore, documents that are owned by a particular individual (patient or client), other documents that are owned by the professionals or health facilities that care for the patient, and also documents whose ownership belongs to a procedure (e.g. judicial)) and that may be known to the different parties or be private for a certain time (for example during the duration of an instructional phase or because they are under a summary secrecy).

Within the current state of the art it is worth mentioning the existence of some identifiers such as the following:

ISO 9362 defines a standard format of commercial identification codes (also known as SWIFT-BIC, BIC, SWIFT ID or SWIFT code) approved by the International Organization for Standardization (ISO). It is a unique identification code for financial and non-financial institutions. The acronym SWIFT stands for Society for Global Interbank Financial Telecommunications. The ISO has designated SWIFT as the registration authority for BIC. When assigned to a non-financial institution, the code is also known as a Business Entity Identifier or EIB. These codes are used when transferring money between banks, particularly for international wire transfers, and also for the exchange of other messages between banks. Codes can sometimes be found on account statements. The SWIFT code has 8 or 11 characters, consisting of: 4 letters for the institution code or bank code, 2 letters for the country code ISO 3166-1 alpha-2, 2 letters or digits for the location code, 3 letters or digits for an optional branch code.

The Legal Entity Identifier (LEI) is a unique global identifier of legal entities involved in financial transactions, whether individuals, companies, or government entities. It consists of a 20-character alphanumeric code based on the ISO 17442 standard that connects to key reference information; it thus allows for clear and unique identification of legal entities involved in financial transactions, such as an entity's ownership structure, and answers questions of "who is who" and "who owns whom". The publicly available LEI dataset can be considered as a global directory of financial market participants and is used to inform financial regulators.

The European Jurisprudence Identifier (ECLI) is an identifier for judicial decisions in Europe, but not open, processed or deliberatively. The identifier consists of five elements separated by two points: ECLI: <country code>: <court identifier>: <decision year>:<specific identifier>.

Decentralized Identifier (DID): is a self-sovereign identifier for individuals, organizations and things, decentralized, persistent, cryptographically verifiable and de-referenced, which may be registered on blockchain or other decentralized network (ledger-agnostic). A DID is created and managed by the identity controller (person or organization) through a computer application such as a wallet or similar.

The prior art, Spanish patent P201531611 establishes a universal identifier for blood donor and other types, such as tissue and organ donors. On the other hand, application PCT/ES2019/000062 describes a universal identifier of products of biological origin for medicinal purposes, such as tissues and organs, as well as from different related entities such as companies, organizations, donation centers, medical centers, clinics, hospitals, laboratories and others. In addition, the invention PCT/ES2019/000076 on a unified protocol of training and health, allows to make the universal identification of an individual and an organization from said invention, in a unified way for training and health, as well as the mobile devices associated with an individual or organization, made by means of the multipurpose identifier that said invention proposes. With regard to medical procedures and documents, the invention PCT/ES2019/000062 allows to generate a unique and non-transferable universal identifier for interventions, whether medical in humans or veterinarians in animals; the invention PCT/ES2019/000076 allows to generate a unique and non-transferable universal identifier for process and product identifiers (X-UHC-PRD) in training and health such as registrations, payments, levels of competence, processes, health training courses for self-care, among others.

It should be noted that informed consents and advance directives (e.g. in the International Patient Summary or IPS) and some legislation such as Law 41/2002 in Spain (in the section Right to patient privacy and Advance directives) are included in a person's medical history. In addition, the right to care information states, on one hand, that the holder of the right to information is the patient and, on the other hand, that the persons linked to it will also be informed, for family or factual reasons, to the extent that the patient allows it expressly or tacitly.

European data protection regulations GDPR provide rights with respect to access and use of data by organizations. In essence, it defines the rights of the individual in relation to data protection. These rights can be summarized in general terms as follows: a) Informed consent: Informed consent laws cover the legal aspect regarding an individual's right to be informed of and consent to a procedure or treatment suggested by a physician or professional. Consent must be explicitly granted and may be withdrawn at any time. This written authorization can limit professional liability issues for the individual providing the service. b) Access: The right to access, free of charge, all the data collected and obtain confirmation of how they are processed. c) Correction: The right to correct the data if it is inaccurate. d) Erase and right to be forgotten (RTBF): The right to request the erasure of the data. e) Data portability: the right to easily retrieve and reuse personal data, for its own purposes, in different services (Article 20 which aims to empower data subjects with respect to their own personal data, as it facilitates their ability to easily move, copy or transmit personal data from one IT environment to another; the main objective of data portability is to improve people's control over their personal data and ensure that they play an active role in their personal data; in the data ecosystem).

Therefore, mechanisms are necessary to enable an individual (such as a patient and also any other type of user) to carry information related to legal procedures and documents related to these and the different parties that compose them, such as medical, administrative, contractual, voting, eligibility, electoral or judicial procedures and documents (e.g. informed consents, advance directives, insurance contracts, contracted coverages and their clauses), among others, as well as the mechanisms that enable individuals to be able to prove and demonstrate both the authenticity of the procedures, documents and legal requirements that they receive from a source and those that the individual subsequently shares with other sources, in a way that there is a universal chain from origin to end and verifiable by all parties, through a unified and universal identification of each of the legal procedures as well as the documents and requirements related to these legal procedures.

In the field of a patient's health, any action requires the free and voluntary consent of the affected party once, upon receipt of the necessary information, he/she has assessed the options of the case. Informed consent is made in writing in cases of surgical intervention, invasive diagnostic and therapeutic procedures and, in general, application of procedures that pose risks or inconveniences of notorious and foreseeable negative impact on the patient's health. In addition, the patient may freely revoke his/her consent at any time and may also waive receiving information (wish not to be informed), so that his resignation must be a recorded documentary, without prejudice to obtaining his prior consent for the intervention. Consent may also be granted on behalf if the patient is unable to make decisions at the discretion of the physician responsible for the care or if his physical or psychic condition does not allow him to take charge of his situation (if the patient lacks a legal representative, consent will be provided by persons linked to him for family or factual reasons), when the patient is legally incapacitated, when the underage patient is not able intellectually or emotionally to understand the scope of the intervention (consent will be given by the child's legal representative after hearing his or her opinion), among others.

In addition to the above, the advance directives are the document by which a person, of legal age and capability, freely and in advance expresses his will in order for it to be fulfilled at the time when he reaches situations in which circumstances he is not able to express such a will personally about the care and treatment of his health or, once death has come, on the fate of his body or his organs, or his own life. The document holder may also appoint a representative to serve as his interlocutor with the doctor or health team to ensure compliance with the advance directives. In addition, these may be freely revoked at any time by giving written evidence. The terminology used to refer to this is and has been very diverse, such as wills of life, biological wills (Geneva), wishes expressed above (Oviedo Convention), living wills, Natural Death or Right to die, advance directives (Anglo-Saxon countries, European countries), advance will document, advance life will document or advance directives.

Currently there is no known, at least by the applicant, a way to identify in any territory the will or legal consent of a donor, patient or participant in clinical trials, nor a way for a multipurpose identifier such as that of the above-mentioned invention to be used for the identification of legal procedures and documents, such as legal consents or advance directives, universally and at any of the different stages of the process or document (current, granted or revoked, among others).

On the one hand, as mentioned in patent PCT/ES2019/000076, a decentralized identifier (DID) is a new type of global unique identifier that is being developed by W3C and is defined as "a new type of identifier for a verifiable and sovereign digital identity". It is a multi-attribute schema that uniquely defines an individual, object, or organization. A user can create a new DID at any time for any reason. A DID is two things: a unique identifier and an associated DID document. The DID is expected to be "persistent and immutable" so that it is outside the influence of anyone other than its owner. The result of resolving a DID (the content) can be cryptographically signed to ensure its integrity. The resolution also provides one or more public keys associated with the DID. Using cryptographic keys, the owner can prove that he has control of the DID. Parties that have exchanged DID can authenticate each other and encrypt their communications. Therefore, through a DID document, information on legal procedures and documents can be securely stored and shared, as well as establishing access permissions to the information contained in the DID document, in such a way that it can be used to achieve the purpose of the present invention.

Credentials are a part of our daily lives (driver's licenses, government-issued passports etc.). These credentials provide benefits when used in the physical world. A verifiable credential can represent all of the same information that a physical credential represents. The addition of technologies, such as digital signatures, makes verifiable credentials more tamper-evident and more trustworthy than their physical counterparts. In this way, holders of verifiable credentials can generate verifiable presentations and then share these verifiable presentations with verifiers to prove they possess verifiable credentials with certain characteristics. Both verifiable credentials and verifiable presentations can be transmitted rapidly, making them more convenient than their physical counterparts when trying to establish trust at a distance. The verifiable credential exchange layer on top of this for identity from multiple sources is a significant improvement in digital identity.

In addition to the above, Lex is a URN namespace (Uniform Resource Name), which allows accurate identification of laws and other legal rules (e.g. urn:lex:br:federal:constituicao:1988-10-05; 1988). URNs are used as unique identifiers (unique IDs), so the URN is also designated as "public (unique) ID". A common use of Lex URNs is to express transparent identifiers, which can be constructed using simple rules or inferences from basic metadata. Example: The Brazilian Lex URN is used for the unique and universal identifier, both legislative and jurisprudence, using formatting and abbreviation rules of the authority name, publication date and local identifier (present in the document title). URN schemes where each URN is also a transparent identifier can be used in distributed (non-central) URN resolution systems; and URNs can be created in the absence of these systems, even before recording on these systems.

In the blockchain area, a ledger is a key concept in Hyperledger Fabric and it stores important factual information about business objects: both the current value of the attributes of the objects and the history of transactions that resulted in these current values. The ledger consists of two distinct, though related, parts: a world state and a blockchain. Each of these represents a set of facts about a set of business objects. The world state holds the current value of the attributes of a business object as a unique ledger state.

The blockchain is structured as sequential log of interlinked blocks, where each block contains a sequence of transactions, each transaction representing a query or update to the world state. The transactions are ordered by the ordering service.

In addition, a Hyperledger Fabric channel is a private "subnet" of communication between several network members, for the purpose of conducting private and confidential transactions, whose members may be in the same territory or in the same organization, or they can be in different territories and/or distinct organizations. A channel is defined by members (organizations), anchor peers per member, the shared ledger, chaincode application(s) or smart contracts, and the ordering service node(s). Each transaction on the network is executed on a channel, where each party must be authenticated and authorized to transact on that channel. Each peer that joins a channel, has its own identity given by a membership services provider (MSP), which authenticates each peer to its channel peers and services.

However, there is currently no known existence of any solution by which the status of the processing or resolution of a legal procedure can be known in any territory or organization and in any of its parts, at least by applicant for the invention, such as processes, documents or legal requirements, among others, whether in the medical, police, judicial, administrative, notary, voting, eligibility, electoral or other spheres. Therefore, no solution is known to overcome the current limitations of the information management systems of each organization and of each country, state, region, city or others, which can also provide a common source of truth for all parties, and that it can empower an individual or entity in a way that allows them to carry the data related to their legal procedures, so that this data can be known and verified by third parties in any place and computer system. For example, there is currently no known way to quickly and conveniently identify and verify legal custody information of a minor or dependent individual in any territory, nor is there a way to identify and verify information on advance directives of a person in any territory, nor a way to quickly and practically identify and verify information on open or concluded legal processes, be they administrative, police, judicial or other (with sentence or resolution in favor or against) of an individual or an organization, in a unified way and from any territory.

In conclusion, and as a reference to the current state of the art, it should be noted that, although different standards, types of registration and identification systems are known on the market, at least on the part of the applicant, the existence of any one with technical and constitutive characteristics similar to those presented by the invention that is asserted here is unknown.

SUMMARY OF THE INVENTION

The proposed invention refers to a method for universal harmonized registration and universal identification of legal procedures and related parties (documents, notifications, notaries, among others), which has advantages and characteristics that will be described in detail below, and that represent an improvement in the current state of the art, carried out in order to achieve the unification in all the systems and territories of the identification of these procedures and their parts (medical, contractual, administrative, police, judicial, notary, voting, eligibility or electoral, among others possible), and to facilitate access to the data related to them, such as those mentioned below, without ruling out other possible ones: medical consents and legal authorizations; legal guardianships, powers of attorney; previous instructions and last wills; birth, death, nationality or criminal record certificates; residence or work permits; notifications, resolutions and/or administrative and judicial resources; calls, public (political and/or public administrative) and private (companies, associations and other organizations) voting, eligibility, electoral processes.

The proposed method allows, through its correct implementation, to identify, access and verify data from a legal procedure, such as the status or resolution of the legal procedure, among others, as well as from any of its parts, in any territory or organization, to overcome the current limitations of the information management systems of each organization and of each country, state, region, city or others, and it also allows providing a common source of truth for all parties, as well as empowering an individual or entity for allowing to carry the data related to their legal procedures, so that this data can be known and verified by third parties in any place and by any computer system.

Currently, when a person goes to donate blood, this person has to pre-fill out and sign a self-exclusion questionnaire consisting of a series of questions that are evaluated by the doctor responsible for collecting blood through a personal interview with that individual. The doctor approves or not that said person may or may not perform blood donation, based on those questions, the answers provided by the individual and the medical interview with that individual, along with other measures such as weight, blood pressure and hemoglobin level. Subsequently, the nurse who performs the blood draw has to verify the doctor's decision and certify in turn whether the blood donation has been correct or not, and if so send a blood sample to the lab along with the blood bag taken for testing and phenotyping.

In the case of organ donation, an individual may have expressed a willingness to donate organs or not in the event of death, and this information has to be verified and verified by healthcare professionals in a very short space of time in order to perform the extraction and transplantation of organs if so.

In the case of a test or medical intervention, the patient himself or a family member authorized as a legal guardian must be informed by the health workers of what will be performed on the patient and sign the informed medical consent document if they agree, prior to performing such test or medical intervention. In addition to the above, in certain cases where the patient is unconscious or in a situation of life or death, it must also be known if the patient has an advance directives document indicating what care he/she wishes to receive in this type of situation, quickly and practically.

In the case of any health care, the staff who care for the individual must verify this individual's health insurance, coverage and insurance validity. Therefore, it must be known when the contracting and signature of the insurance was made, the date of entry into force, the validity of the same and the coverages that were included in that contract.

In the event of a death, the medical examiner performs the certification of death and together with the verification of that death it will also be necessary to know, for example, whether the individual has a document of last wishes, whether he has death insurance and if he has life insurance, as well as know in each specific case whether it is in force or not and the coverages contracted, to initiate the appropriate procedures and to carry out the necessary actions.

In the case of an administrative and/or judicial procedure, medical reports, authorizations and consents of the patient and their relatives, documents on legal custody, document of last wills, etc. may be required.

A group of individuals can legally participate in a clinical trial procedure. This procedure can include in the conditions signed by the participants that at the end of said trial they have to vote anonymously which treatment has worked best for them and rate the different treatments administered, so that all of this is recorded anonymously in the blockchain network. To achieve this, a smart contract programmed in the blockchain network can check the validity of a verifiable credential on the identity of the individual who proceeds to cast the vote anonymously, register the participation of the individual in this process that is part of the clinical trial procedure signed by the individual and collected in a legal document, and then anonymously record the vote cast, but maintaining a dissociation between said data that allows only the voter (owner) to know what the vote cast was and the treatment score. The blockchain's smart contract must therefore be able to first save the participation of a specific individual in order to avoid being able to vote in duplicate and, subsequently, it must be able to group several votes before being registered in a transaction on the blockchain. If an error occurs when registering the voting group, a notification will be sent to the issuers and participation in the legal voting procedure will be allowed again. Therefore, the smart contract must be able to not register each vote in a unique way associated with a specific date and time, because this could allow associating a vote cast on a specific date and time with the notification of the participation of an individual on that date and time, but the smart contract will have to group the registration of several votes together to ensure the anonymization of the votes, thereby avoiding the identification of a specific participant with a type of vote cast in a concrete date and time.

Therefore, there are a series of procedures and legal documents that must be approved and signed by the authorized person in each case, and must be verified by other parties. In addition, this verification has to be carried out almost immediately in some cases (to know the legal guardian, family member or an authorized person on the part of the patient, if the individual is an organ donor or not, coverage and validity of medical, life or death insurance, etc.). Anonymization of data and grouping of multiple records may also be necessary to ensure the dissociation of data from individuals.

Within a person's unified medical history, informed consent and advance directives are included, such as in the International Patient Summary (IPS) developed by CEN (European Committee for Standardization) and HL7 (Health Level Seven) and in some legislation (e.g. Spanish law 41/2002 on the right to privacy of the patient and advance directives). In addition, the right to healthcare information, on one hand, establishes that the owner of the right to information is the patient and, on the other hand, that the people linked to the patient are also informed to the extent that the patient expressly or tacitly allows them (for family reasons or in fact). In addition to the above, the European GDPR data protection regulations also establish that the person is the owner of their data and that they have the right to carry it. Therefore, mechanisms are necessary to ensure that a person (a patient in the case of health care and any other type of user) can carry information related to legal procedures and documents (medical, administrative, notary, judicial, etc.), both open and closed, in force or revoked, and whether they are public processes (in public administrations, courts, etc.) or private in any specific organization, either in care processes (for example in health), of administrative processing (for example expedition health insurance, licenses, visas, etc.) or in other cases, and that the data carried by the person can be checked and verified quickly, practically and safely by means of the necessary access permissions.

The aim of the present invention is to improve attention to individuals, facilitate the provision of services and improve communication between different administrations and organizations in one or more territories, through the empowerment of individuals, carried out through a method that allows generating and registering a unique and non-transferable public identifiers to be associated with legal procedures and with related parties, so that they can be used quickly, practically and safely by verifying the validity of the identifier in one or more public and/or private blockchain networks, such as in health facilities to know and verify information about informed consents, notary documents, advance directives, legal custody, validity and health insurance coverage, without ruling others.

The invention refers, specifically, to a method of universal registration and identification of legal procedures and related parties, whose purposes are to achieve the harmonization of the identification of legal procedures (initiated or finalized, issued or in process, in force or expired, granted or revoked, among others) and of the different parts that compose them or related to them (documents, notifications, notaries, among others), carried out in order to facilitate access and validation of the information of these procedures as well as documents, notifications, individuals and/or organizations related to these, in a unified way in one or more territories, through the appropriate access permissions, as well as the unification of the history of these procedures and documents that the same individual or organization may have in one or more territories, organizations or administrations, in order to avoid the atomization and disaggregation of existing data, facilitating the identification of these procedures and documents as well as access and verification of data in a fast and practical way.

The object of this invention falls, specifically, on a method whose purpose is to achieve: a) the unification of the identification of legal procedures and related parties, so that the status of the processing or resolution of a legal procedure and of any of its parts (such as processes, documents or legal requirements, among others) can be universally known in any territory or organization, whether in the medical, police, judicial, administrative, notarial, voting, eligibility, electoral or other fields; b) to have a common source of truth about legal procedures for all parties; c) to identify each party in a secure manner, so that the current limitations of the information management systems of each organization and of each country, state, region, city or others are overcome; d) to facilitate an individual or organization to be able to carry the data related to their legal procedures and that these can be known and verified by third parties, through the appropriate access permissions; e) the unification of the history of procedures and documents that the same individual or organization may have in one or more territories, organizations or administrations, in order to avoid the atomization and disaggregation of existing data; f) to facilitate the identification of these procedures and their parts as well as the access and verification of the data in a fast and practical way.

The identifier consists of a unique and non-transferable public code in URN, UUID, OID and DID format, without ruling out others, which is uniquely and unambiguously related to a DID document stored in a highly available computer system accessible to all interested parties and/or authorized and from any territory (for example a distributed and fault tolerant cloud system). Further: The data associated with the universal identifier can be anonymized and stored in a blockchain network to guarantee its immutability, persistence and inalterability, so that only the creator, the entity responsible for creation, the owner of the data and the entity responsible for the data knows which entity the data obtained from the universal identifier refers to. The access permissions to the information can be stored in a blockchain network that also ensures the non-alteration and persistence of the permissions granted by the creator and by the owner of the data. Anonymized data and permissions are associated with a unique, non-transferable identifier for each user in the system. This identifier can consist of a UUID identifier, DID, a PKI private key (without ruling out other types) and can be generated either by the user himself or by the computer system, to be stored in a database in the computer system. The anonymized data that the universal legal procedure identifier contains can be displayed as a verifiable credential within a verifiable presentation, and the verifiable presentation can contain several verifiable credentials (for example, the identity of who the legal procedure data refers to), so that all this information can be verified by the personnel or services authorized to access said information. The computer system blockchain network can contain several channels and store data related to certain laws in different channels and in specific geographical areas.

The present invention presents advantages and characteristics, which will be described in detail below, which represent an improvement of the current state of the art.

DESCRIPTION OF THE DRAWINGS

The achievements in this document shall be better understood from the following detailed description with reference to the drawings, in which:

FIG. 1 shows, using a block diagram, the operating flow scheme of the method, according to the invention.

DETAILED EXPLANATION OF THE INVENTION

The object of this invention refers to a method whose purpose is to achieve the unification of the identification of legal procedures and related parties through which the status of the processing or resolution of a legal procedure can be known universally in any territory or organization, as well as any of its parts, whether in the medical, police, judicial, administrative, notary, voting, eligibility, electoral or other spheres, that allows a common source of truth for all the parties and identify each party in a secure way, to overcome current barriers and limitations in different organizations and distinct territories, allowing an individual or organization to carry the data related to their legal procedures, the verification of the related data, the assignation of access rights for accessing the data, as well as the unification of the history of procedures and documents that the same individual or organization may have in one or more territories, organizations or administrations, in order to avoid the atomization and disaggregation of the data, facilitating the identification of these procedures and of its parts, as well as the access and verification of data in a fast and practical way.

For a better understanding of this, an example is: a medical professional who creates and signs a medical document after a medical intervention, the medical center responsible for the medical procedure, a minor patient referred to in the legal medical document and the legal guardian of the patient. Another example is: a legal guardian signing a medical consent (legal document), the minor referred to in the legal document, healthcare professionals and the medical center that receive the legal document of the medical consent.

The identifier consists of a unique and non-transferable public code in URN, DID, UUID and OID formats, without ruling out others, which is uniquely related to a DID document. Said identifier is generated by a computer application installed on an electronic device and/or by a computer system; the identifier can be stored within the application itself and also in one or more computer systems accessible by all parties related to said identifier, as well as being transmitted to another computer application or computer system (via the Internet, Bluetooth, NFC, without ruling out other possible connection types).

Additionally: An individual's computer application with the necessary permissions (for example, the creator or owner of the data) can store one or more identifiers (i) and associated DID documents (iii), to be carried out by the individual through this application, so that a third party can read these identifiers through a computer application and proceed to request the necessary permissions to access the information, as well as carry out the appropriate verifications to check the validity of the data accessed through said identifiers, through a computer system and a connection between both applications (v).

The DID document (iii) can be stored in one or more highly available computer systems and accessible by all interested and/or authorized parties and from any territory (for example a distributed and fault-tolerant cloud system, among others).

The data associated with the universal identifier and contained in the DID document (iii) can be anonymized and stored in one or more blockchain networks to guarantee its immutability, persistence and inalterability, so that only the creator, the entity responsible for creation, the owner of the data and the entity data controller knows which entity the data obtained from the universal identifier of the legal procedure refers to.

The DID document associated (iii) with the generated identifier (i), which is stored in one or more computer systems, may contain different types of information and access permissions to each type of information, may be stored in one or more networks of blockchain, so that they also ensure the non-alteration and persistence of the permissions granted by the creator and by the owner of the data, for example in one or more public or private blockchain networks (Hyperledger Fabric or others).

Anonymized data and permissions are associated with a unique, non-transferable identifier for each user in the system. This identifier can consist of a UUID or DID identifier, without ruling out other types, and can be generated either by the user himself through a computer application or by a computer system automatically, to be stored in a database in the computer system.

The anonymized data that the universal legal procedure identifier contains can be displayed as a verifiable credential within a verifiable presentation, and the verifiable presentation can contain several verifiable credentials (for example the identity of who the legal procedure data refers to), so that all this information can be verified by the personnel or services authorized to access said information.

The computer system blockchain network can contain several channels and store data related to certain laws in different channels and in specific geographical areas.

A DID document that contains the data of a vote in a legally established procedure, will contain a participation record issued and signed by a smart contract of a blockchain network (for example a transaction ID), so that only the individual and the system where the voting is carried out will know the universal identifier of the DID document of the vote, to control that the same individual cannot vote twice. In addition, the smart contract of the blockchain network will store the votes in a grouped and anonymous way, without the DID document of origin of the vote being known in the blockchain, in such a way that a time stamp of a DID document cannot be identified in the computer system of participation in the legal procedure with a time stamp of the transaction of the vote issued in the blockchain network.

Entering in details, if the data associated with the universal identifier contains personal data, this data can be anonymized and stored in a blockchain network to guarantee its immutability, persistence and inalterability, so that it can be used for statistical and research studies (for example, anonymous clinical data for medical research to fight against diseases and pandemics). In this case, only the creator, the entity responsible for creation, the owner of the data and the entity responsible for the data know which entity the data obtained from the universal identifier refers to; Only these involved parties can relate the anonymous data obtained from the universal identifier of a legal procedure with the entity to which said data refers.

As it mentioned above, the data that the universal legal procedure identifier contains can be displayed as a verifiable credential within a verifiable presentation, and the verifiable presentation can contain several verifiable credentials (for example the identity of who the legal procedure data refers to), so that all this information can be verified both by the medical center and by the medical professionals authorized to access said information. Likewise, the access permissions to the information can be stored in a blockchain network that also ensures the non-alteration and persistence of the permissions granted by the creator and by the owner of the data.

The proposed invention, therefore, allows to register and identify in a public and universal way the legal procedures related to individuals and entities such as public or private organizations, as well as to the parties related or that make up said procedure, whether they are responsible organizations. of the procedure, people qualified in it (for example notaries or other professionals such as health personnel), the subjects to which it refers, documents that compose it (such as informed consents, emergency reports, nursing care reports, registration, prior instructions, insurance contracts, contracted coverage and its clauses, invoices, results of laboratory tests, image), among others, whether in medical, judicial, police, notarial, administrative, voting, eligibility, electoral or other legal procedures, so that said legal procedure and related parties can be identified in a unique, univocal, non-transferable way and in any territory.

The identifier preferably uses a nomenclature in URN format that allows DID, OID and UUID to be combined in the same resource, although the identifier's "urn:" header can be omitted and/or substituted to adapt to different protocols (such as for transmission through a header in the HTTP protocol), and thus allows a combined use, on one hand, of verifiable identification of entities registered in centralized systems and, on the other hand, of the decentralization of the generation of particular identifiers of each particular procedure or its parts, which differs in this respect from other URNs and identifiers known so far. The basic structure, as a non-limiting example, of the generated unique and non-transferable legal procedure public identifier (i) will contain all or some of these fields: i.a) identifier header such as urn:x-legal or X-LEGAL, depending on each case, which is mandatory in all the identifiers generated and may additionally also include the type of procedure or part of the procedure to which it refers; i.b) country and administrative divisions to which the identifier refers, made in ISO 3166-1 alpha-2 (two-letter country codes) and ISO 3166-2 (administrative divisions and territories); i.c) entities and subdivisions to which it refers and the type of identification thereto (multipurpose identifier for training and health, OID, BIC, LEI or others); i.d) system generator of the UUID and the value of the UUID generated, mandatory in all generated identifiers; i.e) DID identifier generator system for the DID document and id of the generated DID document, required for all generated identifiers.

An example of the basic structure of the identifier proposed by the invention is shown below, in an illustrative and non-limiting manner:

urn:x-legal:<id-legal-procedure-type>
<country>:<administrative-sublevel1>:<administrative-sublevel2>:<administrative-sublevel3>:
entity:<id-system-type>:<entity-id>:
department:<id-system-type>:<department-id>:
office:<id-system-type>:<office-id>:
uuid:<uuid-type-and-base>:<uuid-value>:
document:did:<did-system>:<did-value>

This nomenclature can be adapted to other formats such as HTTPS headers or vCard cards for different forms of data transfer (via the Internet or by QR codes, NFC, without ruling out others). For example, the identifier that this utility proposes can be identified as X-LEGAL and transmitted to the different parties. It can also be encoded in BASE64 format and added to a URL in such a way that through that URL the system can check the user or system that requests the data and give access or not to the data contained in the identifier. This URL can also be encoded for example in a QR code that allows its portability, printing and other uses, among other formats.

It should also be noted that the identifier can be generated locally by a computer application of a responsible organization and/or by authorized personnel, or by an external computer system configured for this purpose. The UUID that is part of the identifier can also be encoded in a shorter format such as base58 or base32, among others, converting the UUID code to an integer and then encoding this integer in the chosen base and with the alphabet configured for that base coding.

For the country nomenclature the ISO 3166-1 alpha-2 code (two letter country codes) or the ISO 3166-1 alpha-3 code (three letter country codes) will be used. For the nomenclature of the country region, the ISO 3166-2 code will be used as the international standard to represent the relevant administrative divisions and dependent territories of all countries. Each complete ISO 3166-2 code consists of two parts, separated by a hyphen: the first part is the ISO 3166-1 alpha-2 code for each country; the second part is a string of up to three alphanumeric characters.

The identifier of an entity can correspond to an OID code, it can be a BIC, LEI code, or the unified protocol for identification in training and health, among others.

If a specific field is not used, it will be left empty, remaining in the form "::". In addition, other additional fields can be added to the identifier depending on each specific case.

As a non-limiting example, a legal consent signed in a public hospital in Madrid (ISO code 3166-2: ES-MD) in Spain (ISO code 3166-1 alpha-2: ES), with a public UUID generated by a hospital's own or external computer system "2474ce17-db21-4d2d-898f-5ca09ed15336" and whose data is stored in a DID document with identifier "ExampleDiDBase58" would have a generated public identifier of the type:

urn:x-legal:health:es:es-md:::entity:oid:
        1.123456.789.0.1:::::::uuid:v4-std:2474ce17-db21-4d2d-898f-5ca09ed15336:document:did:type:ExampleDiDBase58

This identifier can be transmitted in different media, such as via HTTPS headers over the internet as shown below:

X-LEGAL:health:es:es-md:::entity:oid:1.123456.789.0.1
        uuid:v4-std:2474ce17-db21-4d2d-898f-5ca09ed15336:
        document:did:type:ExampleDiDBase58

In terms of security, the origin of an identifier received from the entity that generated it can be corroborated, as a non-limiting example, on the one hand by checking the IP address of this entity from which it came, and contrasting this information on the other hand, with the identifier of the entity and the location of the entity that are contained in the identifier itself (of a legal procedure or part of the procedure, such as a document that is sent later to be added to a previously existing procedure).

Therefore, the procedure data can be anonymized to be stored securely in one or more blockchain networks and in compliance with the different legal regulations on data protection, since its origin is collected in the identifier, and this identifier only It would be known by the different related participants, ensuring the privacy and confidentiality of the data. In addition, the DID document (whose identifier is also contained in the procedure identifier), may also contain the access permissions to the information, together with the anonymized information of the legal procedure. Additionally, the anonymized information that is contained in the DID document may also be encrypted, for added security.

In addition to the fields indicated above, additional fields may be added and some of the above fields may be repeated (e.g. a sequence of entities such as different organizations).

Optionally, to anonymize data, at least 1 unique and non-transferable private identifier is used, generated and stored in at least one private computer system (ii), such as the computer system of the entity responsible for generating the public identifier of the invention (for example a hospital or a notary, among others) and allows to relate private information stored in the private computer system (ii) with the public identifier of the invention (i) and with the data stored in a DID document (iii). The private identifier can be, for example, an UUID or a collision-free hash function, such as SHA-3 or other similar algorithms, to generate a unique value from and associated with the legal procedure identifier.

The unique and non-transferable public legal procedure identifier may contain associated identifiers of the parts that compose or related it and, in turn, each of these identifiers may contain associated identifiers of other related parties and the main identifier of the legal procedure.

By means of the public identifier generated according to the invention for a legal procedure, an entity such as an individual, an organization or a digital service, through a computer application installed on an electronic device and through a computer system (v) can, according to that described in the present invention, create and/or use the universal public procedure identifier (i) by means of an application on an electronic device connected to a network such as the Internet (v) and, additionally, carry out the verification of the authenticity of both the identifier as well as the DID document associated with said identifier (iii), the data associated with the identifier through the DID document, as well as access permissions to the information associated with said identifier.

Each of the steps described herein can be performed using a general purpose computing device, e.g., a personal computer, personal digital assistant, and/or computing device that is in communication with a network, e.g., internet, intranet, or extranet, that includes a memory and a set of instructions, that is, logic, specifically scripted to perform the functions, steps, communications, and data manipulations described herein. As the present invention is not limited to any specific instruction set, e.g., code, usable to implement one or more aspects of the present invention, and as those skilled in the art are well aware of the ways to instruct such a computing device to implement such functions, steps, communications, and data manipulations, further details of such specific instruction sets will not be provided here so as to not obscure the present invention. While one or more of the functions, steps, communications, and data manipulations can be performed by hand or by a computer-implemented instruction set, the present invention is not limited to any one sub combination thereof. Data gathering can be performed manually, in a semi-automated manner (e.g., given to a human person who then inputs the data into a computing device's memory), or in a fully-automated manner (e.g., the customer interacts directly with a computing device to input the data into a computer's memory). As will be readily appreciated by those skilled in the art, the present invention also includes the use of multiple computing devices on a communications network (including the use of removable memory media to transfer data between devices), including that the computing device via which data is input by any one human user is different from a computing device that implements decision instruction sets.

However, it should be understood that although numerous characteristics and advantages of the present invention have been exposed in the above description, along with details of the structure and function of the invention, this exhibition is only illustrative. Changes to the details may be made, especially in matters of the shape, size and arrangement of the parties within the principles of the invention to the extent indicated by the broad general meaning of the terms in which the enclosed claims.

Sufficiently described, the nature of the present invention, as well as the way in which it is implemented, it is not considered necessary to make its explanation more extensive so that any expert in the matter understands its scope and the advantages that derive from it, stating that, within its essentiality, it may be put in other modes of realization that differ in detail from that indicated by way of example, and to which it will also achieve the protection that is sought whenever it is not altered, modified or modified in its fundamental principle.

What is claimed is:

1. A computer implemented method of a universal registration and identification of legal procedures, carried out by means of a public and universal legal procedure identifier, the method comprising:

generating said legal procedure identifier by a computer application installed on an electronic device and/or by a computer system, wherein the legal procedure identifier comprises a unique and non-transferable public code in Uniform Resource Name (URN), Decentralized Identifier (DID), Universally Unique Identifier (UUID) and Object Identifier (OID) formats, wherein the legal procedure identifier is uniquely related to a DID document, wherein a DID identifier identifies the DID document;

storing the legal procedure identifier within the application itself and also in one or more computer systems accessible by devices of parties related to said legal procedure identifier;

transmitting the legal procedure identifier to another computer application or computer system through a connection;

wherein the legal procedure identifier is unique and non-transferable; wherein the legal procedure identifier comprises different fields, wherein some of the fields are mandatory and other of the fields are optional and left blank if not used but not deleted; wherein a basic structure of the legal procedure identifier comprises defined basic fields to which other fields are added, and wherein such basic fields comprise:

identifier header;

country and administrative divisions to which the legal procedure identifier refers in ISO formats for country codes and administrative divisions and territories;

entities and subdivisions to which the legal procedure identifier refers and the type of identification thereto;

system generating an UUID identifier and a generated UUID value of the legal procedure identifier; and system generating the DID identifier for the DID document and the DID identifier for the DID document;

wherein a DID document containing data of a vote in a legally established procedure contains a participation record issued and signed by a smart contract of a blockchain network, so that only a device of the individual and the system where the voting is carried out knows the universal identifier of the DID document of the vote, to control that the same individual cannot vote twice;

wherein the method comprises storing, on a smart contract of the blockchain network, votes in a grouped and anonymous way, without the DID document of origin of the vote being known in the blockchain, wherein a time stamp of a DID document cannot be identified in the computer system of participation in the legal procedure with a time stamp of the transaction of the vote issued in the blockchain network.

2. The method according to claim 1, where each generated public identifier is translated into other formats for encoding, transmitting and/or reading in different media.

3. The method according to claim 1, where each generated legal procedure identifier has an associated DID document; wherein said DID document contains information of different types and different permissions to access each type of information.

4. The method according to claim 1 further comprising generating each public identifier in association with at least one unique and non-transferable private identifier generated and stored in at least one private computer system wherein the at least one private identifier allows to relate private information stored on the private computer system with the public and universal legal procedure identifier and with the data stored in a DID document; wherein the at least one private identifier is used for the anonymization of the data; wherein the blockchain network can be configured to contain several ledgers and store the data related to a certain legislation in a different ledger and in a specific geographical area; wherein the private identifier can be a UUID or other type of identifier.

5. The method according to claim 1, where an entity device of an individual, an organization or a digital service, through a computer application installed on an electronic device connected to a network and through a computer system creates and/or uses one of several universal public legal procedure identifiers and, additionally, verifies the authenticity of both the identifiers and the DID documents associated with the different identifiers, of the data associated with said identifiers through DID documents, as well as access permissions to the information associated with these identifiers.

6. The method of claim 1 wherein additional fields of the legal procedure identifier can be added or repeated if necessary to the basic fields.

7. The method of claim 3 wherein the DID document comprises associated identifiers of constituent or related parts and, in turn, each of these associated identifiers comprises further identifiers of other related parties and a main public identifier of a legal procedure in DID documents of the other related parties.

8. The method of claim 3 further comprising validating and certifying the legal procedure identifiers and DID documents generated in one or more public and/or private blockchain networks to check veracity of the legal procedure identifiers, DID documents and content of the DID documents.

9. The method of claim 8 wherein the validating and certifying is by hashing data of the legal procedure identifiers, of the DID documents and/or of different sections of the DID documents.

10. The method of claim 5 further comprising storing, by a computer application of an individual with the necessary permissions, one or more legal procedure identifiers and associated DID documents to be transported by the computer application so that a third party application can read these identifiers and proceed to request necessary permissions to access associated data, as well as carry out the appropriate checks to verify the validity of the data accessed by such identifiers.

11. The method of claim 4, wherein the private identifier is a collision-free hash to generate a unique value associated with the legal procedure identifier.

12. A computer implemented system of a universal registration and identification of legal procedures, carried out by means of a public and universal legal procedure identifier, the system comprising:

a computer application installed on an electronic device for generating said legal procedure identifier, wherein the legal procedure identifier comprises a unique and non-transferable public code in Uniform Resource Name (URN), Decentralized Identifier (DID), Universally Unique Identifier (UUID) and Object Identifier (OID) formats, wherein the legal procedure identifier is uniquely related to a DID document, wherein a DID identifier identifies the DID document;

memory storing the legal procedure identifier within the application itself and also in one or more computer systems accessible by devices of parties related to said legal procedure identifier;

network interface for transmitting the legal procedure identifier to another computer application or computer system through a connection;

wherein the legal procedure identifier is unique and non-transferable; wherein the legal procedure identifier comprises, wherein some of the fields are mandatory and other of the fields are optional and left blank if not used but not deleted; wherein a basic structure of the legal procedure identifier comprises defined basic fields to which other fields are be added, and wherein such basic fields comprise:

identifier header;

country and administrative divisions to which the legal procedure identifier refers in ISO formats for country codes and administrative divisions and territories;

entities and subdivisions to which the legal procedure identifier refers and the type of identification thereto;

system generating an UUID identifier and a generated UUID value of the legal procedure identifier; and system generating the DID identifier for the DID document and the DID identifier for the DID document;

wherein a DID document containing data of a vote in a legally established procedure contains a participation record issued and signed by a smart contract of a blockchain network, so that only a device of the individual and the system where the voting is carried out knows the universal identifier of the DID document of the vote, to control that the same individual cannot vote twice; and wherein a smart contract of the blockchain network stores votes in a grouped and anonymous way, without the DID document of origin of the vote being known in the blockchain, wherein a time stamp of a DID document cannot be identified in the computer system of participation in the legal procedure with a time stamp of the transaction of the vote issued in the blockchain network.

13. The system according to claim 12, where each generated public identifier is translated into other formats for encoding, transmitting and/or reading in different media.

14. The system according to claim 12, where each generated legal procedure identifier has an associated DID document; wherein said DID document contains information of different types and different permissions to access each type of information.

* * * * *